US012670721B2

(12) United States Patent
Abdelhameed et al.

(10) Patent No.: US 12,670,721 B2
(45) Date of Patent: Jun. 30, 2026

(54) DETERMINING CORRECTNESS OF IMAGE DATA OF CAMERA SYSTEM

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 455 days.

(21) Appl. No.: 18/027,656

(22) PCT Filed: Sep. 23, 2020

(86) PCT No.: PCT/EP2020/076581
§ 371 (c)(1),
(2) Date: Mar. 22, 2023

(87) PCT Pub. No.: WO2022/063397
PCT Pub. Date: Mar. 31, 2022

(65) Prior Publication Data
US 2023/0410531 A1     Dec. 21, 2023

(51) Int. Cl.
*G06V 20/58*     (2022.01)
*G06V 10/80*     (2022.01)
*G06V 20/56*     (2022.01)

(52) U.S. Cl.
CPC .............. *G06V 20/58* (2022.01); *G06V 10/80* (2022.01); *G06V 20/588* (2022.01)

(58) Field of Classification Search
CPC ....... G06V 20/58; G06V 10/80; G06V 20/588
See application file for complete search history.

(56) References Cited

U.S. PATENT DOCUMENTS 12,291,240 B1 *  5/2025  Morales Morales .......................
                                     B60W 60/00184
2015/0332114 A1  11/2015  Springer
2017/0180706 A1   6/2017  Salvagnini et al.
(Continued)

FOREIGN PATENT DOCUMENTS

CN        101820550 A      9/2010
CN        108780504 A     11/2018
(Continued)

OTHER PUBLICATIONS

Chinese-language Office Action issued in Chinese Application No. 202080105443.0 dated Jul. 31, 2024 with partial English translation (13 pages).

(Continued)

*Primary Examiner* — Ming Y Hon
(74) *Attorney, Agent, or Firm* — Crowell & Moring LLP

(57)     ABSTRACT

Provided is a method for determining a correctness of image data, the image data being captured by at least two cameras of a camera system installed at a vehicle. The method includes detecting at least one feature in the image data captured by a first one of the at least two cameras, determining if the at least one feature can be detected in the image data captured by a second one of the at least two cameras, and if the at least one feature can be detected in the image data captured by the second one of the at least two cameras, determining the correctness of the image data.

13 Claims, 1 Drawing Sheet

(56)  References Cited

U.S. PATENT DOCUMENTS

| | | | | |
|---|---|---|---|---|
| 2019/0184998 | A1* | 6/2019 | Zheng | B60W 30/182 |
| 2019/0258878 | A1* | 8/2019 | Koivisto | G06V 10/46 |
| 2019/0291727 | A1 | 9/2019 | Shalev-Shwartz et al. | |
| 2019/0299983 | A1* | 10/2019 | Shalev-Shwartz ... | G05D 1/0088 |
| 2019/0370563 | A1 | 12/2019 | Dahal et al. | |
| 2020/0013281 | A1* | 1/2020 | Eriksson | G01S 5/0205 |
| 2020/0088539 | A1 | 3/2020 | Shashua et al. | |
| 2020/0184658 | A1 | 6/2020 | Cui | |
| 2020/0233414 | A1* | 7/2020 | Akella | G06V 20/58 |
| 2021/0398338 | A1* | 12/2021 | Philion | G06V 10/774 |

FOREIGN PATENT DOCUMENTS

| | | |
|---|---|---|
| CN | 109691090 A | 4/2019 |
| CN | 110914641 A | 3/2020 |
| KR | 10-1995813 B1 | 7/2019 |

OTHER PUBLICATIONS

International Search Report (PCT/ISA/210) issued in PCT Application No. PCT/EP2020/076581 dated May 31, 2021 (three (3) pages).

Written Opinion (PCT/ISA/237) issued in PCT Application No. PCT/EP2020/076581 dated May 31, 2021 (six (6) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

* cited by examiner

DETERMINING CORRECTNESS OF IMAGE DATA OF CAMERA SYSTEM

BACKGROUND AND SUMMARY OF THE INVENTION

The present invention is directed to a method for determining a correctness of image data, the image data being captured by at least two cameras of a camera system installed at a vehicle, a control unit being configured to carry out the method, a control system comprising the control unit and the camera system, and a vehicle comprising the control system.

In modern vehicles, e.g. cars, camera systems like a surround view camera system, e.g. a 360° camera system, can be provided, optionally together with another camera or even another other camera system.

Surround view camera systems were originally designed to give a driver of the vehicle new and previously unobtainable viewpoints of the vehicle. These viewpoints benefit the driver in multiple scenarios, e.g. checking a blind spot when changing lanes on a motorway.

The surround view camera system comprises up to four cameras, wherein one camera is provided at a front, one camera is provided at a back, one camera is provided on a left side and one camera is provided on a right side of the vehicle.

Consisting of four cameras in front, in the rear and on the outside rearview mirrors of the car the camera system can monitor an area all around the vehicle, i.e. the whole environment of the vehicle.

The other camera system may consist of up to eight cameras, wherein three cameras are provided at front, one camera is provided at back, two cameras are provided on left side and two more cameras are provided on right side of the vehicle in order to extract more information surrounding the vehicle.

Image data captured by the cameras are fused by a control unit, e.g. an ECU (electronic control unit), such that a three-dimensional (3D) representation of an environment of the vehicle results, i.e. an environment model.

Driver assistance systems can use the environment model as a data basis inter alia to recognize objects, obstacles, lane or pedestrians, warn the driver or even stop the vehicle in critical situations.

Theoretically, the environment model generated based on the image data captured by such a camera system can be used in automated vehicles, e.g. a car of a SAE Level 3 or Level 4 or higher (wherein the SAE J3016 standard describes classification and definition of terms for road-bound vehicles with automated driving systems), as a basis for automated driving, e.g. to detect and keep the vehicle in lane.

However, known camera systems and more specifically the environment models generated based on the captured image data do not meet safety standards required for highly automated driving.

For example, a known surround view camera system is developed according to QM (wherein QM refers to "Quality Management", the level QM means that risk associated with a hazardous event is not unreasonable and does therefore require safety measures in accordance with ISO 26262) and is not qualified to any safety integrity level hence could not be used for highly automated vehicles especially for driving functions.

In other words, for highly automated vehicles, there is no qualified solution available which can take the image data captured by the surround view camera system as QM input and provide a function with safety integrity of ASIL (Automotive Safety Integrity Level) B.

In the light of this state of the art, the object of the present invention is to provide a method for qualifying image data captured by a camera system having a low safety level to a higher safety level, i.e. to alleviate the captured image data to a higher safety level.

The object is solved by the features of the claimed invention.

More specifically, the object is solved by a method for determining a correctness of image data. The image data are captured by at least two cameras of a camera system installed at a vehicle. The camera system can be a surround view camera system and/or another camera system. It is possible that one of the at least two cameras forms part of the surround view camera system and the other one of the at least two cameras forms part of the other camera system.

The method comprises a step of detecting at least one feature in the image data captured by a first one of the at least two cameras.

The method further comprises a step of determining if the at least one feature can be detected in the image data captured by a second one of the at least two cameras.

The method also comprises a step of determining the correctness of the image data, if the at least one feature can be detected in the image data captured by the second one of the at least two cameras.

In conclusion, according to the method the image data captured by the first camera are validated, i.e. verified, with the image data captured by the second camera and vice versa. Thus, it is possible to check the correctness of the image data of each camera of the camera system and therefore higher the safety integrity level of the captured image data of the cameras such that their data output, i.e. the respective captured image data, can be used as a data basis for automated driving functions. These automated driving functions can include a longitudinal guide and/or a lateral guide of the vehicle based on these functions.

However, the method is not limited to a camera system comprising two cameras, but the camera system can also comprise three, four or more cameras, wherein the correctness of the image data captured by the cameras is determined, respectively, using the above described method.

The captured image data, i.e. sensor data, of the at least two cameras can be used for creating an abstract, unified, representation of an environment around the vehicle, e.g. a car or a lane. Such a representation is called an environment model. As explained above, an accuracy of the environment model is important in order to guarantee safety of the vehicle and also of the passengers of the vehicle since the environment model can be used as a data basis for planning a trajectory of the vehicle.

In other words, the method can include a further step of generating an environment model based on the image data captured by the at least two cameras, if the correctness of the image data is determined.

The method can also include a step of planning a trajectory of the vehicle based on the generated environment model.

Additionally or alternatively, the method can include a step of controlling a longitudinal guide and/or a lateral guide of the vehicle based on the image data captured by the at least two cameras, if the correctness of the image data is determined. Optionally, the method can include a step of controlling a longitudinal guide and/or a lateral guide of the vehicle based on the planed trajectory of the vehicle. Thus, the vehicle can be an automated or autonomous vehicle, e.g. a vehicle with an automated system of SAE Level 3 or higher. At SAE Level 3 (i.e. "eyes off") the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. The automated system is like a co-driver that will alert the driver in an orderly fashion when it is the driver's turn to drive. An example would be a Traffic Jam Chauffeur. At SAE Level 4 (i.e. "mind off") no driver attention is ever required for safety, e.g. the driver may safely go to sleep or leave the driver's seat. Self-driving is supported only in limited spatial areas (e.g. geofenced) or under special circumstances such as extreme weather conditions i.e. heavy rain, Snow or storm. Outside of these areas or circumstances, the vehicle must be able to safely abort the trip, e.g. park the car, if the driver does not retake control. An example would be a robotic taxi or a robotic delivery service that only covers selected locations in a specific area. At SAE Level 5 (i.e. "steering wheel optional") no human intervention is required at all. An example would be a robotic taxi that works on all roads all over the world, all year around, in all weather conditions.

The image data can be captured at a same time by the first and the second one of the at least two cameras. Optionally, the control unit is configured to fuse image data captured by the first and the second one of the at least two cameras, and further optionally, the control unit is configured to fuse the image data captured by the first and the second one of the at least two cameras with respect to the at least one feature such that the at least one feature reaches a higher safety integrity level than before fusing.

It is thus possible that the method includes a further step of synchronizing a clock of the first one of the at least two cameras with a clock of the second one of the at least two cameras such that in a further step the image data captured at the same time by the first and the second one of the at least two cameras can be extracted from the captured image data of the first and the second one of the at least two cameras.

It is possible that each one of the at least two cameras comprises a so-called slave clock which is used for providing a timestamp to the image data captured by the respective camera of the at least two cameras. If the slave clocks of the two cameras are synchronized to each other, for example using a master clock provided in or at the vehicle (e.g. using the Precision Time Protocol, PTP, if the cameras are connected via communication bus i.e. Ethernet, Flexray, CAN etc.), the timestamp provided to the image data by both of the cameras can be used for determining if the image data were captured at the same time by the cameras. Thus, it is possible to extract these image data from all captured image data of the first and the second one of the at least two cameras and use them for determining the correctness of the captured image data.

Additionally or alternatively, the at least two cameras can comprise an at least partly overlapping field of view. Only that part of the image data captured by the first one of the at least two cameras can be used for detecting the at least one feature which corresponds to an area where the field of view of the first one of the at least two cameras overlaps with the field of view of the second one of the at least two cameras.

This provides inter alia the advantage that not the whole image data of the cameras must be used for determining the correctness thereof, but solely a relevant part thereof thereby minimizing a computing power necessary for determining the correctness of the image data.

The above-mentioned field of view (FOV), i.e. horizontal FOV and/or vertical FOV, of the at least two cameras can be a value which depends on a hardware and/or software limitation of the respective camera. The field of view can refer to an area in an angle of view (AOV) of the camera (e.g. film or recording sensor) within which events and/or changes in an environment can be perceived and recorded. The angle of view can describe an angular extent of a given scene that is imaged by the respective camera.

As described above, the field of view of the first one of the at least two cameras and the field of view of the second one of the at least two cameras overlap each other. That is, in a certain area (i.e. space) of the environment of the vehicle events and/or changes can be perceived and recorded by both cameras.

At least one feature to be detected in the image data captured by the first one of the at least two cameras can be a lane boundary and/or an object.

The object can include a static and/or a moving object in the environment of the vehicle. Using the lane boundary as the feature to be detected provides the advantage that a plurality of driving assist functions, e.g. a lane keeping assist, are already configured to detect the lane boundary. It is thus possible, that the both cameras itself are configured to detect the feature to be detected, e.g. comprise a lane boundary detection or object detection, which might be used in the above described method.

With the above described method, it is possible determine the correctness of captured image data and thus qualify this data to a higher safety integrity level.

For example, there can be four camera sensors mounted at front of the vehicle, back of the vehicle, left side of vehicle and right side of vehicle. The camera system can be developed as QM and does not have any safety integrity for either parking or driving functions. QM is the lowest safety integrity level according to the ASIL classification. More specifically, ASIL (Automotive Safety Integrity Level) is a risk classification scheme defined by ISO 26262—Functional Safety for Road Vehicles. The ASIL classification comprises five safety levels, starting from QM with the lowest safety requirements to ASIL D having the highest safety requirements. According to the above described method the field of view of the front camera can be plausibilised with the field of view of the left side camera and/or the right-side camera. During the plausibilisation of functions and features such as lane boundary detection and/or object detection, i.e. during determination of the correctness of the captured image data, of the front camera, the images from the front camera are compared to the lane boundary detection and/or object detection of left side camera and/or right side camera. If similar lane boundaries and object detection features are detected and plausibilised, the features can be elevated from QM to ASIL B and/or to ASIL D. Thus, it is possible to use the system being developed as QM in (highly) automated driving requiring ASIL B, ASIL C and/or ASIL D.

Furthermore, a control unit is provided. The control unit is configured to receive image data, the image data being captured by at least two cameras of a camera system installed at a vehicle; detect at least one feature in the image data captured by a first one of the at least two cameras; determine if the at least one feature can be detected in the image data captured by a second one of the at least two cameras; and if the at least one feature can be detected in the image data captured by the second one of the at least two cameras, determine the correctness of the image data. Optionally, the control unit is configured to output the camera data with a safety integrity level of ASIL B or higher.

The image data can be captured at a same time by the first and the second one of the at least two cameras. Optionally, the control unit is configured to fuse image data captured by the first and the second one of the at least two cameras, and further optionally, the control unit is configured to fuse the image data captured by the first and the second one of the at least two cameras with respect to the at least one feature such that the at least one feature reaches a higher safety integrity level than before fusing The at least two cameras can comprise an at least partly overlapping field of view. The control unit can be configured to only use that part of the image data captured by the first one of the at least two cameras for detecting the at least one feature which corresponds to an area where the field of view of the first one of the at least two cameras overlaps with the field of view of the second one of the at least two cameras.

The at least one feature to be detect in the image data captured by the first one of the at least two cameras can be a lane boundary and/or an object.

The control unit can be configured to carry out the above described method. The explanation given above with respect to the method is also applicable to the control unit and vice versa.

Furthermore, a control system is provided. The control system comprises a camera system for a vehicle, the camera system comprising at least two cameras, and the control unit as described above.

The explanation given above with respect to the method and the control unit is also applicable to the control system and vice versa.

Furthermore, a vehicle comprising the above described control system is provided. The control unit of the control system is configured to control a longitudinal guide and/or a lateral guide of the vehicle based on the image date, if the correctness of the image data is determined.

The explanation given above with respect to the method, the control unit and the control system is also applicable to the control system and vice versa.

In the following a description of an embodiment of the present invention is given with respect to FIGS. 1 and 2.

DETAILED DESCRIPTION OF THE DRAWINGS

Figure 1:
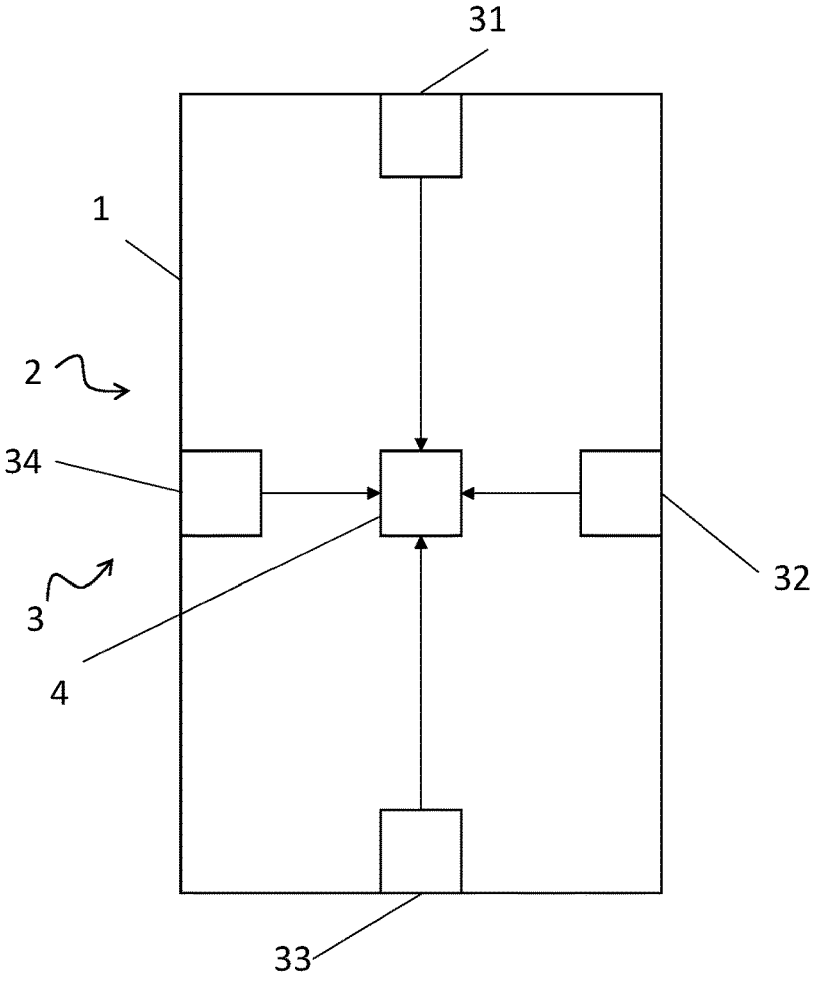
FIG. 1 depicts schematically a vehicle comprising a control system.

In FIG. 1 a vehicle 1 is shown. The vehicle is a car configured to automatically carry out driving functions such as a longitudinal guide and/or a lateral guide of the vehicle.

Therefore, the vehicle 1 comprises a control system 2. The control system 2 comprises a camera system 3 and a control unit 4 both installed at the vehicle 1. The camera system 3 can be a surround view camera system. It is possible that the camera system comprises, additionally or alternatively, another camera system.

The camera system 3 comprises four (or more) cameras 31, 32, 33, 34. More specifically, the camera system 3 comprises a front camera 31 installed at a front side of the vehicle 1, a right side camera 32 installed at a right side of the vehicle 1, a rear side camera 33 installed at a rear side of the vehicle 1, and a left side camera 34 installed at left side of the vehicle 1.

It is possible, if the other camera system is provided, that the other camera system 3 comprises four, six, eight or ten cameras. The other camera system can comprise three cameras installed at front side of the vehicle 1, two cameras installed at the right side of the vehicle 1, one camera installed at a rear side of the vehicle 1, and two cameras installed at left side of the vehicle 1.

In the following description it is assumed that only a surround view camera system comprising the four cameras 31, 32, 33, 34 is provided. However, the following description applies mutatis mutandis to the other camera system which can be provided alternatively or additionally to the surround view camera system.

Each one of the four cameras 31, 32, 33, 34 is a sensor having a defined field of view and is configured to capture image data (e.g. pictures or video data) corresponding to an environment of the vehicle 1 in the field of view of the respective camera 31, 32, 33, 34. Moreover, each one of the four cameras 31, 32, 33, 34 is configured to output the captured image data, optionally timestamped, to the control unit 4.

The control unit 4 comprises an input interface, an output interface, a processing unit and a storage unit, wherein the input interface is connected to the processing unit, and the processing unit is connected to the storage unit as well as to the output unit.

The input interface of the control unit 4 is provided for receiving the captured image data from each one of the four cameras 31, 32, 33, 34. The input interface is configured to input the received image data to the processing unit.

The processing unit is configured to load a computer program stored in the storage unit, use the received image data as input for the program, carry out the computer program and output a result received by carrying out the computer program via the output unit to the vehicle 1.

Figure 2:
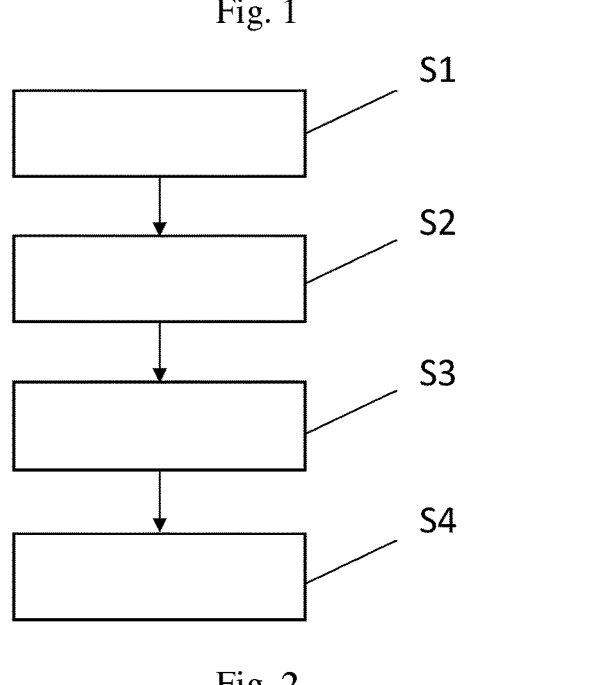
FIG. 2 depicts a flowchart of a method for determining a correctness of image data.

The computer program comprises steps of a method for determining a correctness of image data. This method will be described in detail with reference to FIG. 2. In conclusion, the control unit 4 is configured to carry out the method for determining the correctness of the image data. The image data is captured by at least two cameras 31, 32, 33, 34 of the above described camera system 3 installed at the vehicle 1.

The method comprises three steps S1-S3, and optionally a fourth step S4.

In a first step S1 of the method at least one feature in the image data captured by a first one of the at least two cameras 31, 32, 33, 34 is detected by the control unit 4. For example, the image data captured by the front camera 31 are used for detecting, i.e. extracting and determining, the at least on feature.

The at least one feature to be detect in the image data captured by the first one of the at least two cameras can be a lane boundary and/or an object.

In a second step S2 of the method, the control unit 4 determines if the at least one feature can be detected also in the image data captured by a second one of the at least two cameras 31, 32, 33, 34. For example, the image data captured by the right side camera 32 are used for determining if the at least on feature detected in the first step S1 is also present in the image data of the right side camera 32.

In a third step S3 of the method, the control unit 4 determines the correctness of the image data captured by both cameras of the at least two cameras 31, 32, 33, 34, here captured by the front camera 31 and the right-side camera 32. The image data are determined to be correct if the at least one feature can be detected in the image data captured by the second one of the at least two cameras, here also in the image data of the right-side camera 32.

Preferably, the image data used for determining the correctness of the captured image data of the cameras 31, 32, 33, 34 are captured at the same time. Optionally, the control unit 4 is configured to fuse image data captured by the first and the second one of the at least two cameras 31, 32, 33, 34, and further optionally, the control unit 4 is configured to fuse the image data captured by the first and the second one of the at least two cameras 31, 32, 33, 34 with respect to the at least one feature such that the at least one feature reaches a higher safety integrity level than before fusing It is also possible that the at least two cameras, in the above example the front side and the right-side camera 31, 32, comprise an at least partly overlapping field of view. Then it is possible that the control unit 4 only uses that part of the image data captured by the first one of the at least two cameras 31, 32, 33, 34 for detecting the at least one feature which corresponds to an area where the field of view of the first one of the at least two cameras overlaps with the field of view of the second one of the at least two cameras 31, 32, 33, 34.

It is also possible to use more than one camera for verifying the correctness of image data of another camera of the four cameras 31, 32, 33, 34. Moreover, any two of the given cameras, either a side camera and a rear camera, a front camera and a side or rear camera of the vehicle 1 could at least extract one or more feature with ASIL.

Moreover, it is possible that the method comprises a fourth step S4. In the fourth step S4 the control unit 4 controls a longitudinal guide and/or a lateral guide of the vehicle 1 based on the image date, if the correctness of the image data is determined in the third step S3.

REFERENCE SIGNS LIST 1 vehicle
2 control system
3 camera system, e.g. surround view camera system and/or other camera system
31-34 cameras of camera system
4 control unit
S1-S4 method steps
The invention claimed is:

1. A method for determining a correctness of image data, the image data being captured by at least two cameras of a camera system installed at a vehicle, the method comprising:
   detecting at least one feature in the image data captured by a first one of the at least two cameras;
   determining whether the at least one feature is detectable in the image data captured by a second one of the at least two cameras;
   upon determining that the at least one feature is detectable in the image data captured by the second one of the at least two cameras, determining the correctness of the image data; and
   upon determining the correctness of the image data, increasing a safety integrity level of the at least one feature.

2. The method according to claim 1, wherein the image data are captured at a same time by the first one of the at least two cameras and the second one of the at least two cameras.

3. The method according to claim 1, wherein:
   the at least two cameras comprise an at least partly overlapping field of view; and only a part of the image data captured by the first one of the at least two cameras is used for detecting the at least one feature which corresponds to an area where a field of view of the first one of the at least two cameras overlaps with a field of view of the second one of the at least two cameras.

4. The method according to claim 1, wherein the at least one feature is at least one of a lane, a lane boundary, an object, or an obstacle.

5. A control unit comprising a processor, wherein the control unit is configured to:
   receive image data, the image data being captured by at least two cameras of a camera system installed at a vehicle;
   detect at least one feature in the image data captured by a first one of the at least two cameras;
   determine whether the at least one feature is detectable in the image data captured by a second one of the at least two cameras;
   upon determining that the at least one feature is detectable in the image data captured by the second one of the at least two cameras, determine the correctness of the image data; and
   upon determining the correctness of the image data, increase a safety integrity level of the at least one feature.

6. The control unit according to claim 5, wherein the control unit is further configured to output the camera data with the safety integrity level of ASIL B or higher.

7. The control unit according to claim 5, wherein the image data are captured at a same time by the first one of the at least two cameras and the second one of the at least two cameras.

8. The control unit according to claim 7, wherein the control unit is further configured to fuse image data captured by the first one of the at least two cameras and the second one of the at least two cameras.

9. The control unit according to claim 8, wherein the control unit is further configured to fuse the image data captured by the first one of the at least two cameras and the second one of the at least two cameras with respect to the at least one feature such that the at least one feature reaches a higher safety integrity level than before fusing.

10. The control unit according to claim 5, wherein:
   the at least two cameras comprise an at least partly overlapping field of view, and
   the control unit is configured to only use a part of the image data captured by the first one of the at least two cameras for detecting the at least one feature which corresponds to an area where a field of view of the first one of the at least two cameras overlaps with a field of view of the second one of the at least two cameras.

11. The control unit according to claim 5, wherein the at least one feature is at least one of a lane, a lane boundary, an object, or an obstacle.

12. A control system comprising:
   a camera system for a vehicle, the camera system comprising at least two cameras; and
   the control unit according to claim 5.

13. A vehicle comprising the control system according to claim 12, wherein the control unit is configured to control at least one of a longitudinal guide or a lateral guide of the vehicle based on the image data, upon determining the correctness of the image data.

* * * * *